United States Patent
Joy et al.

(10) Patent No.: US 12,244,657 B2
(45) Date of Patent: Mar. 4, 2025

(54) MESSAGE INFRASTRUCTURE PLATFORM TRANSITIONS BASED ON SUBSCRIPTION HEURISTICS

(71) Applicant: Oracle International Corporation, Redwood Shores, CA (US)

(72) Inventors: Ajai Joy, Cary, NC (US); Balaji Krishnan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 7 days.

(21) Appl. No.: 18/184,557

(22) Filed: Mar. 15, 2023

(65) Prior Publication Data

US 2024/0314183 A1    Sep. 19, 2024

(51) Int. Cl.
*H04L 65/61* (2022.01)

(52) U.S. Cl.
CPC ................... *H04L 65/61* (2022.05)

(58) Field of Classification Search
CPC ...................................... H04L 65/61
USPC .......................................... 709/217
See application file for complete search history.

(56) References Cited

U.S. PATENT DOCUMENTS

| | | | | |
|---|---|---|---|---|
| 9,467,970 | B1* | 10/2016 | Kim | H04L 67/30 |
| 2018/0167476 | A1* | 6/2018 | Hoffner | H04L 67/55 |
| 2019/0013992 | A1* | 1/2019 | Schuhart | H04L 69/10 |
| 2020/0153888 | A1* | 5/2020 | Lazu | H04L 67/10 |

OTHER PUBLICATIONS

Arnaud Cogoluegnes, Offset Tracking with RabbitMQ Streams, Sep. 13, 2021, https://www.rabbitmq.com/blog/2021/09/13/rabbitmq-streams-offset-tracking (Year: 2021).*

* cited by examiner

*Primary Examiner* — Zi Ye
(74) *Attorney, Agent, or Firm* — Invoke (57) ABSTRACT

Techniques for transitioning between message infrastructure platforms are disclosed. A platform manager transmits a data stream using a first message infrastructure platform. A platform monitor monitors transmission characteristics associated with the transmission of the data stream using the first message infrastructure platform. A platform selector selects a second message infrastructure platform based on the transmission characteristics. A platform transitioner transitions from transmitting the data stream using the first message infrastructure platform to transmitting the data stream using the second message infrastructure platform seamlessly.

26 Claims, 5 Drawing Sheets

MESSAGE INFRASTRUCTURE PLATFORM TRANSITIONS BASED ON SUBSCRIPTION HEURISTICS

TECHNICAL FIELD

The present disclosure relates to provisioning and adapting streaming data pipelines on different message infrastructure platforms. In particular, the present disclosure relates to transitioning from one message infrastructure platform to another infrastructure platform responsive to real-time data about the transmission characteristics.

BACKGROUND

Streaming platforms transmit data streams comprising event messages from a publisher to one or more consumers, often in real-time or near real-time. The data streams are transmitted from the publisher to the consumer via a message infrastructure platform. There are different types and formats of message infrastructure platforms, each with different capabilities and limitations.

Selecting the appropriate type of message infrastructure platform can be challenging, for example, if one or more transmission characteristics of the data stream are unknown, if the user is inexperienced, or if one or more aspects of the data stream are unpredictable. If an inappropriate message infrastructure platform is selected, errors may arise during transmission or consumption, data loss may occur, or the data stream may not function optimally. This conventionally requires a user at the publisher to select and provision another message infrastructure platform and to dismantle the first message infrastructure platform.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. TRANSITIONING A DATA STREAM BETWEEN MESSAGE INFRASTRUCTURE PLATFORMS
4. EXAMPLE EMBODIMENT
5. COMPUTER NETWORKS AND CLOUD NETWORKS
6. HARDWARE OVERVIEW
7. MISCELLANEOUS; EXTENSIONS

1. General Overview

One or more embodiments transition from transmitting a data stream using a first message infrastructure platform to transmitting the data stream using a second message infrastructure platform, without pausing the transmission of the data stream. A platform manager receives a data stream from a data stream publisher. The platform manager initially selects and configures a first message infrastructure platform for transmission of the data stream. The platform manager transmits the data stream using the first message infrastructure platform. The platform manager monitors transmission characteristics associated with the transmission of the data stream using the first message infrastructure platform. When the transmission characteristics indicate that the first message infrastructure platform is not appropriate for the data stream, the platform manager selects a second message infrastructure platform based on the transmission characteristics. The platform manager may configure the second message infrastructure platform while the data stream is being transmitted using the first message infrastructure platform. The platform manager then transitions, e.g., fans out, from transmitting the data stream using the first message infrastructure platform to transmitting the data stream using the second message infrastructure platform, without pausing or interrupting the transmission of the data stream. The platform manager then continues transmitting the data stream using the second message infrastructure platform. In an example, the platform manager selects a transition point in a sequence of packets. Packets prior to the transition point, in the sequence of packets, are transmitted using the first message infrastructure platform. Packets subsequent to the transition point, in the sequence of packets, are transmitted using the second message infrastructure platform.

One or more embodiments described in this Specification and/or recited in the claims may not be included in this General Overview section.

2. Architectural Overview

Figure 1:
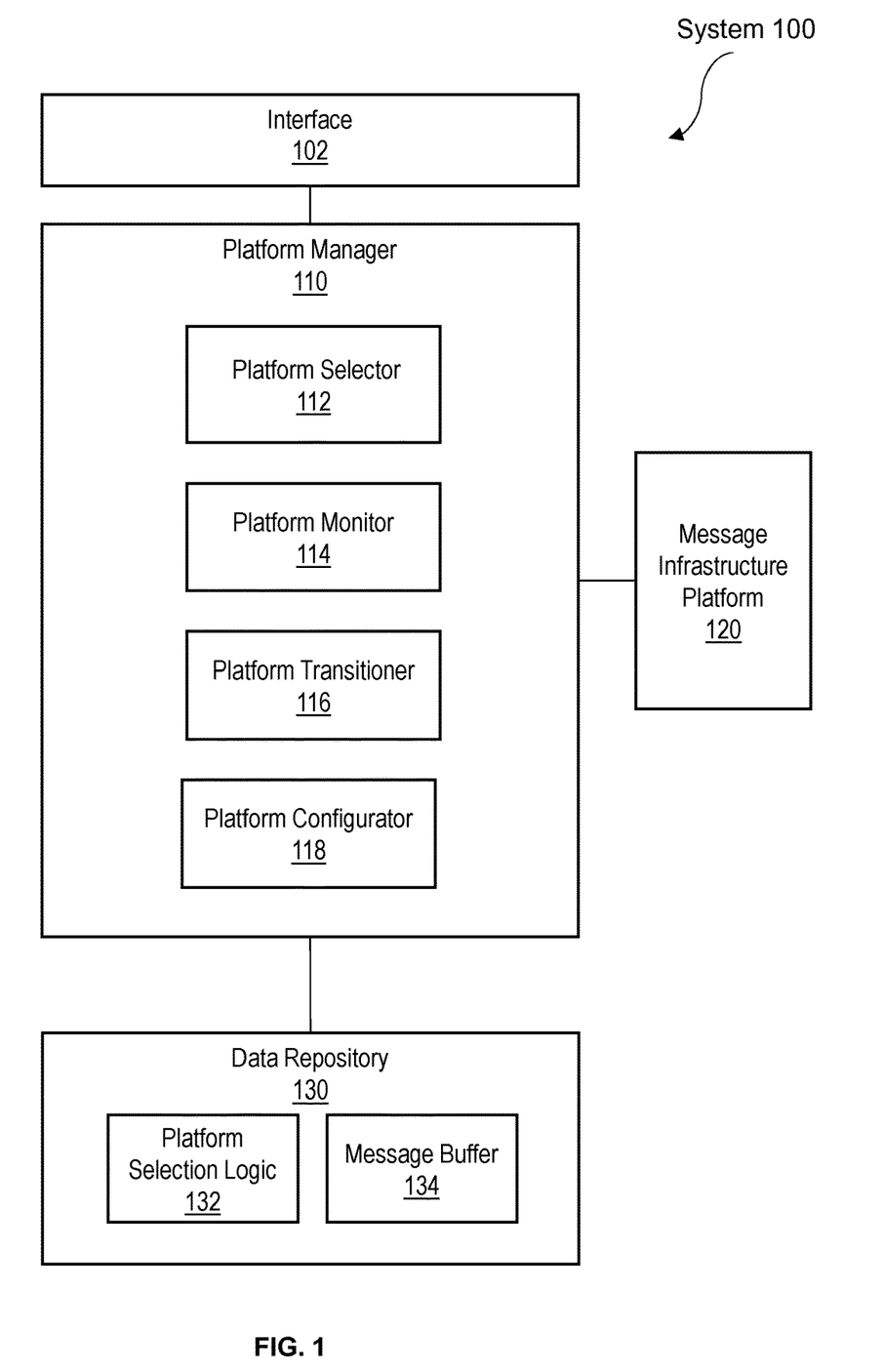
FIG. 1 illustrates a system in accordance with one or more embodiments.

FIG. 1 illustrates a system 100 in accordance with one or more embodiments. As illustrated in FIG. 1, system 100 includes an interface 102, a platform manager 110, one or more message infrastructure platforms 120, and a data repository 130. In one or more embodiments, the platform manager 110 may include one or more functional components such as a platform selector 112, a platform monitor 114, a platform transitioner 116, and a platform configurator 118.

In one or more embodiments, the platform manager 110 refers to hardware and/or software configured to perform operations described herein for transmitting and monitoring transmission characteristics of a data stream on a message infrastructure platform. The platform manager 110 further performs operations for selecting another message infrastructure platform and transitioning the data stream to the other message infrastructure platform when the transmission characteristics do not correspond to parameters of the initial message infrastructure platform. The platform manager 110 may be a component of a cloud service that provides data stream publishing and management.

In one or more embodiments, the system 100 may include one or more message infrastructure platforms 120. A message infrastructure platform 120 may include the logic and computing resources to support receiving a message from a publisher and delivering the message to one or more consumers. A message infrastructure platform 120 may include, for example, storage resources to support storing messages prior to consumption, and in some cases, storing messages after consumption for a limited time for redundancy purposes. A message infrastructure platform may be queue-based. A message queue delivers each message only once, to only one consumer. Queues do not preserve message order, with the exception of first-in, first-out (FIFO) queues. When the consumer is busy, the queue will store messages. To ensure the queue doesn't drop messages that haven't been delivered yet, the queue needs to persist. Durability and persistency are two important qualities to look for in a message queue.

A message infrastructure platform may be stream-based. A stream-based message infrastructure platform can deliver one message to multiple consumers simultaneously. A stream preserves the order of the messages in its queue. A stream may have a read-write ratio of 2:1, which may limit the number of consumers. A stream can handle high data volume, and has ultra-low latency, e.g., less than 100 ms.

A message infrastructure platform may be based on publish-subscribe messaging (pub-sub). In pub-sub messaging, the publisher of the message assigns a topic to the message, and consumers subscribe to a topic. The publisher does not know who the consumers are, or how many there are. Pub-sub messaging preserves message order within a partition and can support a large number of consumers. Pub-sub messaging can handle high data volume and has higher latency than streams.

A message infrastructure platform may be based on database messaging. Database messaging may be suitable as a message infrastructure platform when a data stream has multiple consumers and/or requires an order guarantee, has low data volume and/or high latency, and can be compacted.

Returning to the platform manager 110, in one or more embodiments, platform selector 112 refers to hardware and/or software configured to perform operations described herein for selecting a message infrastructure platform according to one or more data stream characteristics. The message infrastructure platform 112 may receive a selection from a user of one or more data stream characteristics that the user expects their data stream to have and may select a message infrastructure platform according to the received characteristics using platform selection logic 132.

Platform selection logic 132 may include instructions and/or data that may be used to select a message infrastructure platform from an initial set of characteristics. Platform selection logic 132 may be a decision tree, for example. A decision tree may include a logical flow of choices and consequences, where a choice may be a characteristic of a data stream and a consequence may be a message infrastructure platform, or a subsequent choice.

One data stream characteristic may be an ordering requirement, where the sequence of the messages must be preserved. Another data stream characteristic may be a supported message size, which indicates a maximum size, e.g., a number of bytes, that a message can have, or a size range that a message can have. Another data stream characteristic may be a message retention time, which indicates a length of time that a message must be retained by the system. Another data stream characteristic may be a throughput, which indicates how much data must be transmitted for a unit of time. Another data stream characteristic may be a latency, which indicates how much of a delay may be permissible in transmitting a message. Another data stream characteristic may be an idempotency requirement. Idempotency refers to a property of operations that do not change the result no matter how many times they are executed. Operations on financial data are likely to require that data be changed only once even if a transaction message is received more than once. In contrast, in a database write operation, for example, writing the same data multiple times may be permissible. Another data stream characteristic may be a read/write ratio, which may restrict a number of read or write operations for the data stream. Another data stream characteristic may be a delivery number requirement, for example, deliver exactly once; deliver at least once; and deliver effectively once. Another data stream characteristic may be a consumption type, for example, the publisher pushes the data stream messages, or the consumer pulls the data stream messages.

In one or more embodiments, platform monitor 114 refers to hardware and/or software configured to perform operations described herein for monitoring transmission characteristics associated with the transmission of a data stream using a message infrastructure platform. The platform monitor 114 may measure the transmission characteristics and compare the measurements to parameters of the message infrastructure platform. The platform monitor 114 may receive or observe error conditions associated with transmission of the data stream.

In one or more embodiments, platform transitioner 116 refers to hardware and/or software configured to perform operations described herein for transitioning a data stream from one message infrastructure platform to another message infrastructure platform, for example, when the platform monitor 114 determines that the measured transmission characteristics are inconsistent with the parameters of the initial message infrastructure platform. The platform transitioner 116 may transition the data stream to the second message infrastructure platform seamlessly, that is, without noticeable interruption in the data stream and without data loss to the consumer.

In one or more embodiments, the platform configurator 118 refers to hardware and/or software configured to perform operations described herein for configuring a message infrastructure platform when one is selected for a data stream transmission. The platform configurator 118 may assign compute resources such as processors and memory to a message infrastructure platform. The platform configurator 118 may establish end points and assign network resources for the message infrastructure platform according to its parameters.

A message buffer 134 may be used by the platform manager 110 and/or by a message infrastructure platform 120 during data stream transmission, for example, to store published messages prior to consumption, to facilitate a transition process, and/or for retention purposes.

Examples of operations for selecting a message infrastructure platform, monitoring a data stream, and transitioning a data stream to another message infrastructure platform are described below with reference to FIG. 3.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or executed on the same computing system as the platform manager 110. Alternatively, or additionally, a data repository 130 may be implemented or executed on a computing system separate from the platform manager 110. The data repository 130 may be communicatively coupled to the platform manager 110 via a direct connection or via a network.

Information describing platform selection logic 132 and one or more message buffers 134 may be implemented across any of components within the system 100. However, this information is illustrated within the data repository 130 for purposes of clarity and explanation.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

In one or more embodiments, interface 102 refers to hardware and/or software configured to facilitate communications between a user and the platform manager 110. Interface 102 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 102 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 102 is specified in one or more other languages, such as Java, C, or C++.

3. Transitioning a Data Stream Between Message Infrastructure Platforms

Figure 2A:
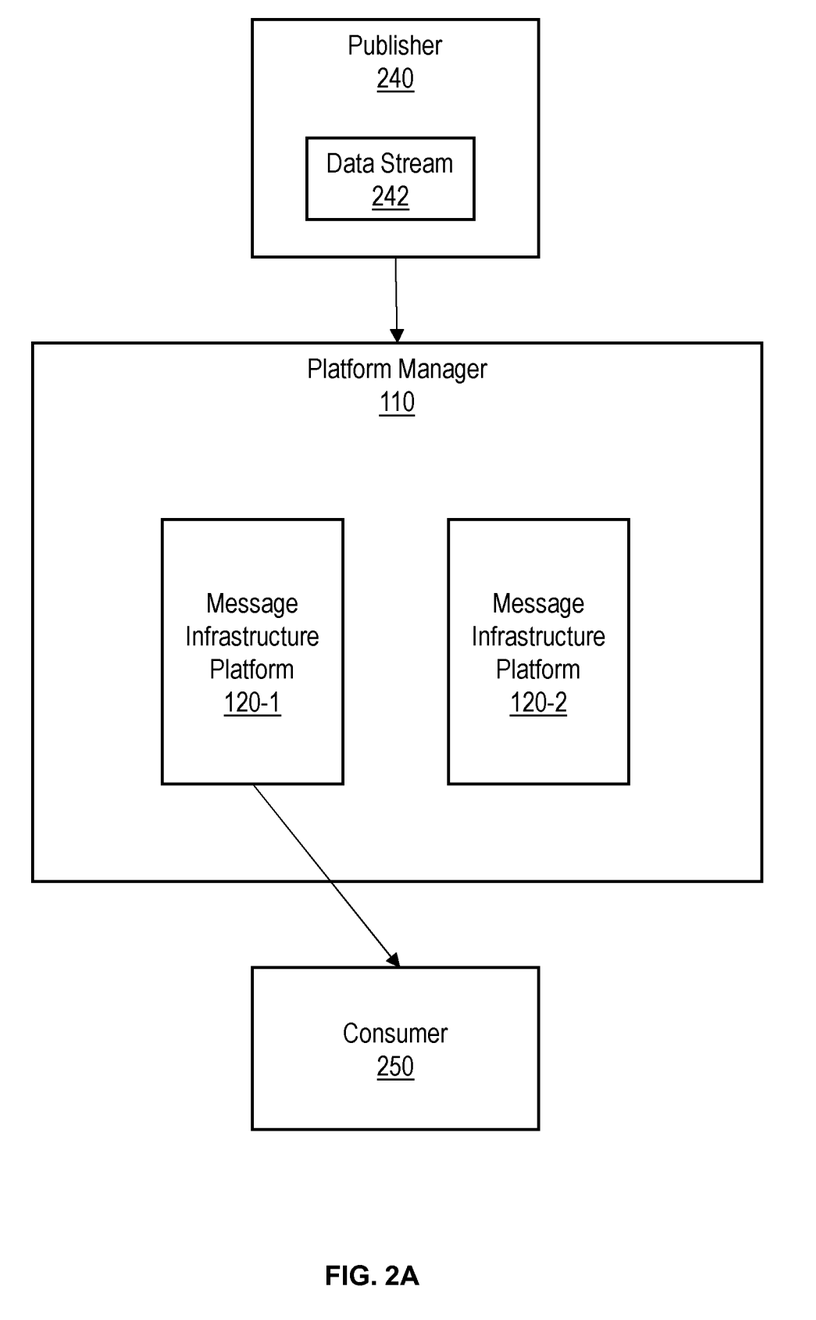
FIGS. 2A-B illustrate an example of transitioning a data stream in accordance with one or more embodiments.
Figure 2B:
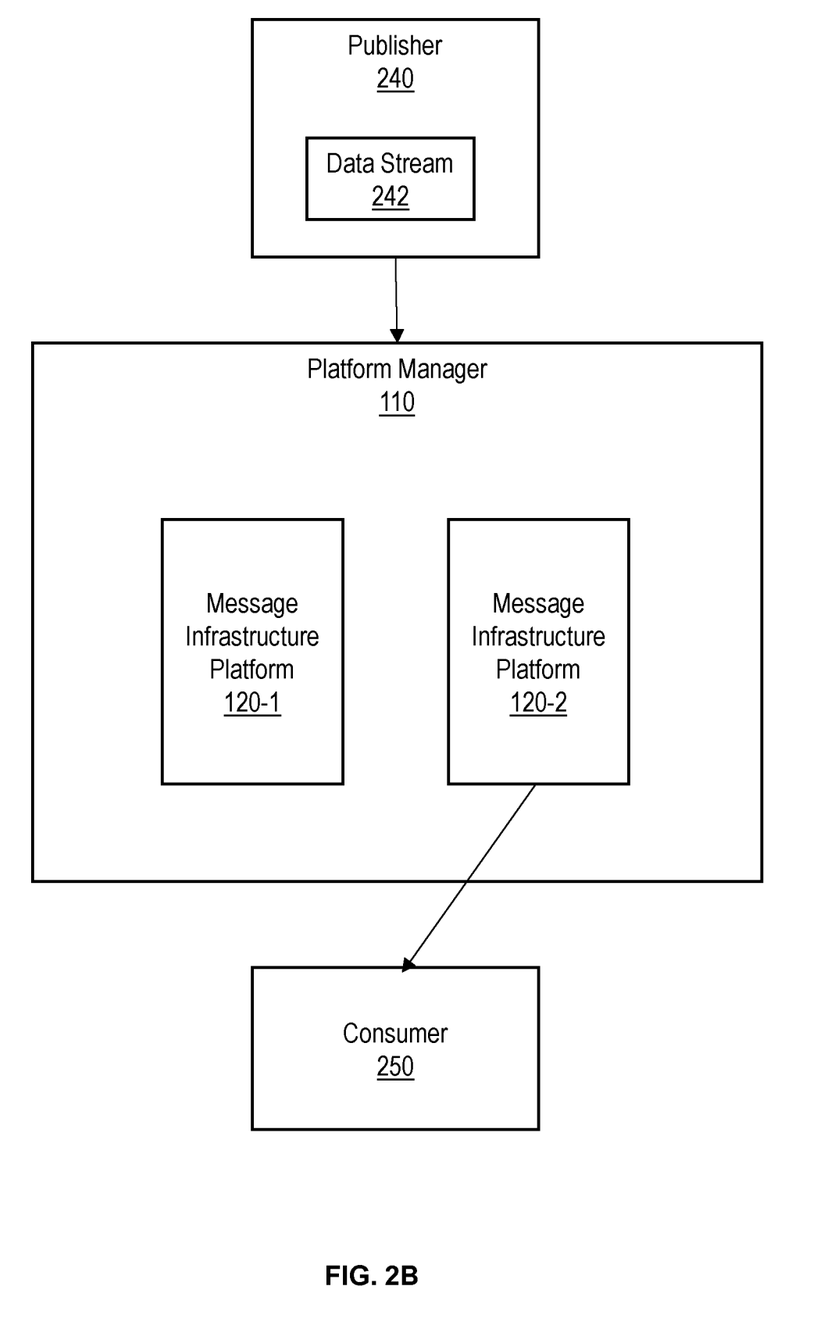

FIGS. 2A-B illustrates an example of the system transitioning a data stream from one message infrastructure platform to another. FIG. 2A shows a publisher 240 in communication with the platform manager 110. The publisher 240 produces a data stream 242 of event messages. The platform manager 110 has selected message infrastructure platform 120-1 to transmit the data stream 242 to a consumer 250. Neither the publisher 240 nor the consumer 250 may be aware of the message infrastructure platform 120-1.

In FIG. 2B, the platform manager 110 has determined that the transmission characteristics of data stream 242 are inconsistent with the parameters of message infrastructure platform 120-1 and has selected message infrastructure platform 120-2 as having parameters consistent with the transmission characteristics of data stream 242. The platform manager 110 has accordingly transitioned the data stream 242 over to the message infrastructure platform 120-2. The transition is transparent to the publisher 240 and to the consumer 250.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
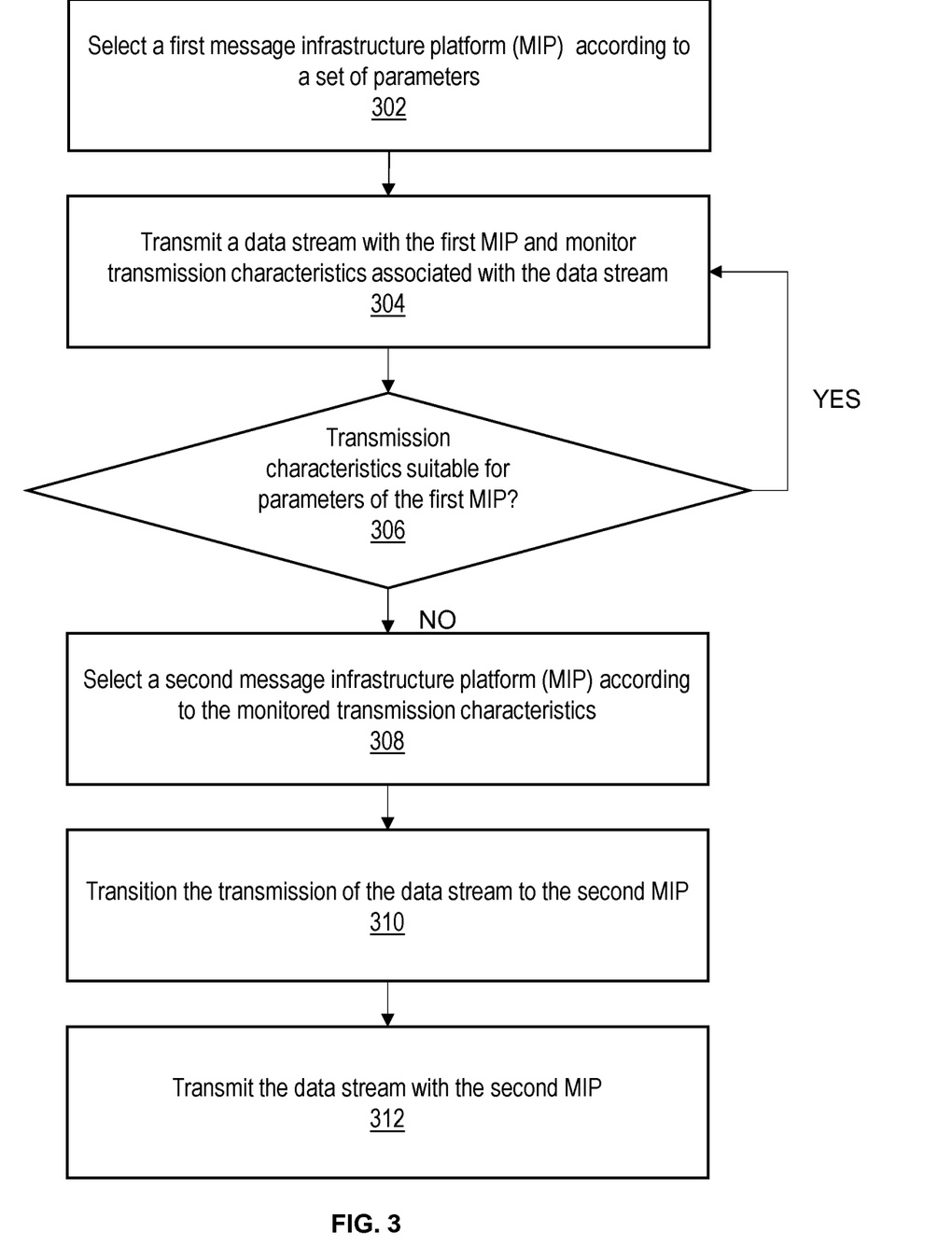
FIG. 3 illustrates an example set of operations for transitioning a data stream from one message infrastructure platform to another in accordance with one or more embodiments.

FIG. 3 illustrates an example set of operations for transitioning a data stream from one message infrastructure platform to another when transmission characteristics of the data stream do not correspond to the initial message infrastructure platform, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In one or more embodiments, the platform manager 110 selects a first message infrastructure platform according to a set of parameters (Operation 302). The platform selector 112 may present one or more data stream options to a user via the interface 102. The options may correspond to quality of service (QOS) parameters and other data stream characteristics, e.g., ordering, latency, supported message size, or number of consumers.

The user may select all of the options that apply to their intended data stream. The platform selector 112 may apply the user's selected characteristics to the platform selection logic 132 to arrive at a first message infrastructure platform.

In some cases, the platform selector 112 may guide the user, via the interface 102, through a series of selection options, for example, by following the platform selection logic 132. As an example, the platform selector 112 may first prompt the user to select whether there is only one consumer or multiple consumers and whether ordering is desired. Once the user has selected from those options, the platform selection logic 132 may branch to different selections of additional data stream characteristics, such as latency and data volume, depending on the selections in the first step. The platform selector 112 may continue to prompt the user for selections until the platform selection logic 132 reaches an end point corresponding to a specific message infrastructure platform.

If the user does not select any data stream options, or selects too few options for the platform selection logic 132 to reach an end point, the platform selector 112 may select a default message infrastructure platform to start with, for example, a queue-based message infrastructure platform.

The platform configurator 118 may configure the first message infrastructure platform. As an example, the platform configurator 118 may identify the data source, e.g., the publisher, and may establish a source connection point from which the data stream will be received. The platform configurator 118 may configure the data stream by specifying, for example, a schema, a data format, and a message size limit, or other options selected by the user. The platform configurator 118 may apply settings such as partitioning, replication, compression, and/or retention. The platform configurator 118 may establish an end point to which consumers may connect to receive the data stream. The platform configurator 118 may assign compute and network resources to transfer the data stream from the publisher to the consumer, and to monitor the transmission characteristics.

In one or more embodiments, the platform manager 110 transmits a data stream with the first message infrastructure platform and monitors transmission characteristics of the transmission (Operation 304). The platform manager 110 may receive a data stream 242 from a publisher 240 and may transmit the data stream to one or more consumers 250 via the first message infrastructure platform.

The platform monitor 114 may observe, measure, or otherwise determine transmission characteristics that indicate how the data stream is actually behaving. The platform monitor 114 may, for example, determine the size of the messages, the latency of the messages, how many consumers are receiving the data stream, a throughput, and/or how quickly the messages are consumed. The platform monitor 114 may receive error messages output by the message infrastructure platform, a consumer, or other entities within the data stream system when the message infrastructure platform receives messages that do not conform to the requirements of the message infrastructure platform.

In one or more embodiments, the platform manager 110 determines whether the transmission characteristics are suitable for the parameters of the first message infrastructure platform (Operation 306). The platform monitor 114 may compare the transmission characteristics to parameters of the first message infrastructure platform. As an example, the platform manager 114 may compare the observed message size to a message size supported by the first message infrastructure platform and may determine that the observed message size is too large for the message infrastructure platform. In another example, the platform manager 114 may compare the retention time for the first message infrastructure platform with the timing of how soon messages are consumed and may determine that the messages are consumed much faster, e.g., within an hour, than the retention time, e.g., two weeks. In an example, a received error condition may automatically trigger a determination that the transmission characteristics do not correspond to parameters of the first message infrastructure platform.

In one or more embodiments, the platform selector 112 may update the platform selection logic 132 when the transmission characteristics do not correspond to parameters of the first message infrastructure platform, based on the selected second message infrastructure platform. As an example, the platform selector 112 may add a choice and/or a consequence to a decision tree, or modify an existing choice or consequence, such that following the modification would result in the selection of the second message infrastructure platform from the selection of options received in Operation 302. The platform selector 112 may use machine learning to update the platform selection logic 132.

In one or more embodiments, if the platform manager 110 determines that the transmission characteristics correspond to parameters of the first message infrastructure platform, the platform manager 110 returns to Operation 304. Otherwise, the platform manager 110 selects a second message infrastructure platform according to the transmission characteristics when the transmission characteristics do not correspond to parameters of the first message infrastructure platform (Operation 308). The platform selector 112 may select a second message infrastructure platform in a way similar to that in Operation 302, however, the platform selector 112 may use the monitored transmission characteristics as input to the platform selection logic 132.

The platform configurator 118 may configure the second message infrastructure platform. The platform configurator 118 may retain the source connection point and the end point from the first message infrastructure platform. The platform configurator 118 may retain some or all of the assigned compute and network resources, or may assign different compute and network resources for the second message infrastructure platform. The data stream for the second message infrastructure platform may be configured according to the transmission characteristics determined from the existing data stream, e.g., with a different schema, data format, and/or message size limit compared to the first message infrastructure platform.

In one or more embodiments, the platform manager 110 transitions the transmission of the data stream to the second message infrastructure platform (Operation 310). The platform transitioner 116 may begin the transitioning after the second message infrastructure platform is configured. The platform transitioner 116 may identify a transition point in a sequence of messages in the data stream. The platform manager 110 may transmit messages in the data stream prior to the transition point using the first message infrastructure platform. The platform transitioner 116 may transmit any messages subsequent to the transition point, in the sequence of messages, using the second message infrastructure platform.

The platform transitioner 116 may use an intermediate storage structure, such a message buffer 134 to divert messages from the first message infrastructure platform to the second message infrastructure platform such that the message characteristics such as order, retention, and time are retained from one message infrastructure platform to the other. The platform transitioner 116 may use offset tracker information to determine which messages in a particular subscription stream have already been consumed and which have not yet been consumed. The platform transitioner 116 may accordingly only transition the messages that have not yet been consumed.

In some instances, the platform transitioner 116 may initiate the transmitting of messages subsequent to the transition point using the second message infrastructure platform while at least one message in the sequence of messages is currently being transmitted using the first message infrastructure platform. On other instances, the platform transitioner 116 may initiate the transmitting of messages subsequent to the transition point using the second message infrastructure platform while at least one message in the sequence of messages is still stored in a buffer used for transmitting messages using the first message infrastructure platform.

The platform transitioner 116 may switch at least one message publisher and at least one message consumer from using the first message infrastructure platform to using the second message infrastructure platform. For example, the platform transitioner 116 may change a connection of an output of the publisher from an input to the first message infrastructure platform to an input of the second message infrastructure platform. Similarly, the platform transitioner 116 may change a connection of an input to a consumer from the output of the first message infrastructure platform to the output of the second message infrastructure platform.

The platform transitioner 116 may determine that transmission of a particular packet using the first message infrastructure platform has failed. In response, the platform transitioner 116 may transmit the particular packet, and subsequent packets, using the second message infrastructure platform.

In one or more embodiments, the platform manager 110 transmits the data stream with the second message infrastructure platform (Operation 312). The platform manager 110 may dismantle the first message infrastructure platform, for example, by releasing any compute resources used by the first platform. In one or more embodiments, the platform manager 110 may continue to monitor the transmission characteristics of the data stream on the second message infrastructure platform and may transition the data stream to yet another message infrastructure platform if the transmission characteristics of the data stream change.

By way of example, suppose that a user initially selects data stream options of a 2 Mbps put and 1 Mbps read, with ordering, and a 10-day retention. The platform selector 112 may use the platform selection logic 132 with those options to select a stream-based message infrastructure platform. Suppose then that the actual data stream has an order of magnitude greater number of messages than expected, i.e., 10 Mbps put and 10 Mbps read. This may result in an error that there are too many requests to the message infrastructure platform. The platform monitor 114 may observe the error or the actual number of messages and may prompt the platform selector 112 to select a different message infrastructure platform. The platform selector 112 may then select, e.g., a queue-based message infrastructure platform, which has a higher read write ratio. In another scenario, if, in the same initial configuration, there are then too many consumers to the stream, the system may select a different message infrastructure platform that can support more consumers reading the data stream. In still another scenario, the platform monitor 114 may determine that the messages are being consumed within an hour of publication, making a 10-day retention longer than necessary. The system may then reduce the retention time for that message infrastructure platform or may transition to a second message infrastructure platform of the same type, but with a different retention time parameter.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
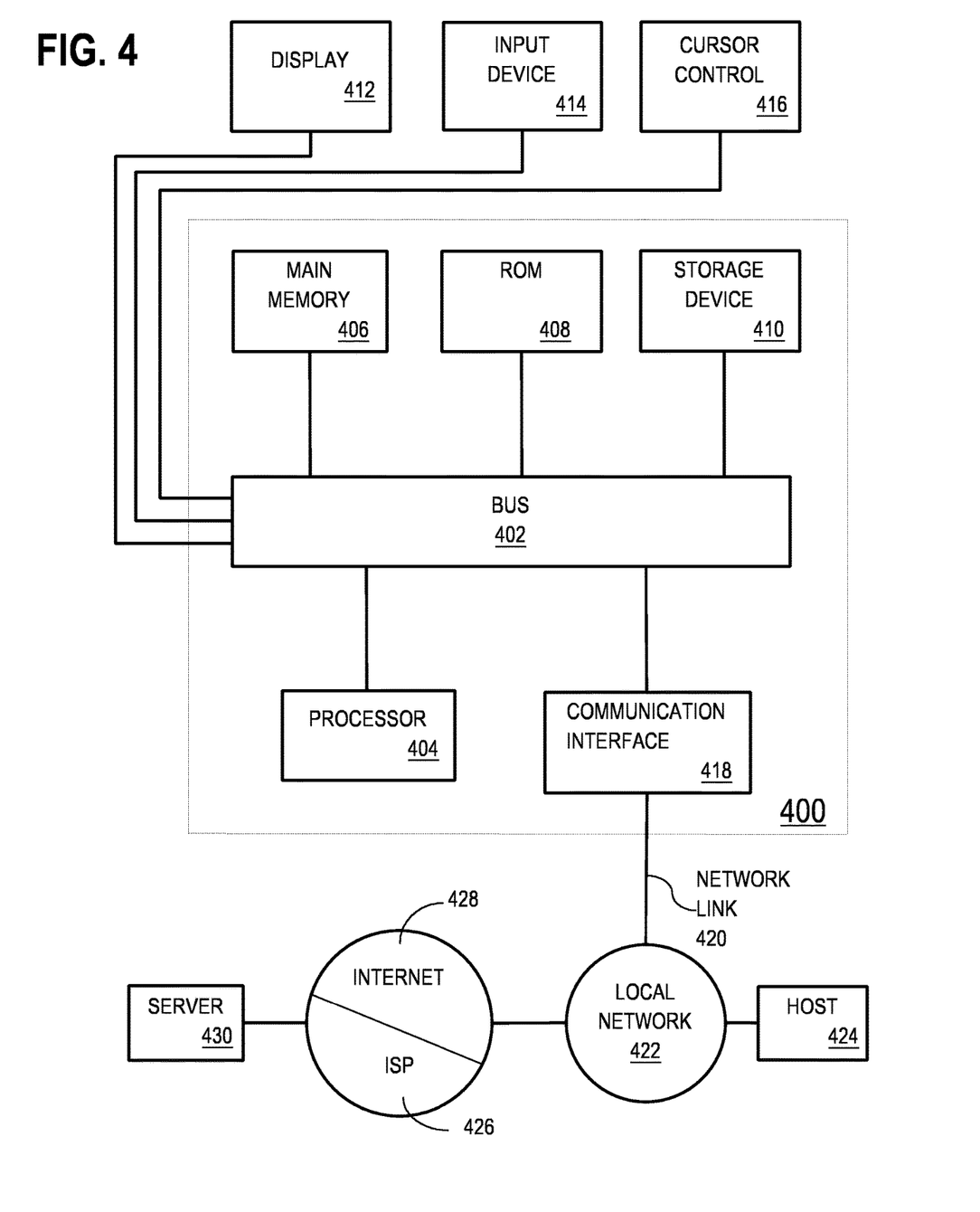
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, causes performance of operations comprising:
    transmitting a data stream using a first message infrastructure platform comprising a first set of compute resources and network resources;
    monitoring transmission characteristics associated with the transmission of the data stream using the first message infrastructure platform;
    determining that the transmission characteristics do not correspond to parameters of the first message infrastructure platform;
    selecting a second message infrastructure platform having parameters that correspond to the transmission characteristics;
    configuring the second message infrastructure platform with a second set of compute resources and network resources;
    transitioning from transmitting the data stream using the first message infrastructure platform to transmitting the data stream using the second message infrastructure platform; and
    transmitting the data stream using the second message infrastructure platform.

2. The one or more media of claim 1, wherein the transitioning operation comprises:
    identifying a transition point in a sequence of messages in the data stream;
    transmitting messages prior to transition point, in the sequence of messages, using the first message infrastructure platform; and
    transmitting messages subsequent to the transition point, in the sequence of messages, using the second message infrastructure platform.

3. The one or more media of claim 2, wherein the transitioning operation further comprises:
    initiating the transmitting of messages subsequent to the transition point using the second message infrastructure platform while at least one message in the sequence of messages is currently being transmitted using the first message infrastructure platform.

4. The one or more media of claim 2, wherein the transitioning operation further comprises:
    initiating the transmitting of messages subsequent to the transition point using the second message infrastructure platform while at least one message in the sequence of messages is still stored in a buffer used for transmitting messages using the first message infrastructure platform.

5. The one or more media of claim 1, wherein selecting the second message infrastructure platform based on the transmission characteristics comprises selecting the second message infrastructure platform based on at least one of:
    an ordering requirement;
    a supported message size;
    a message retention time;
    a throughput;
    a latency;
    an idempotency requirement;
    a read/write ratio;
    a consumption type;
    a deliver exactly once requirement;
    a deliver at least once requirement; and
    a deliver effectively once requirement.

6. The one or more media of claim 1, wherein the first message infrastructure platform and the second message infrastructure platform are different message infrastructure platforms from a plurality of message infrastructure platforms comprising two or more of:
    a queue-based message infrastructure platform;
    a stream-based message infrastructure platform;
    a publish-subscribe message infrastructure platform; and
    a database messaging message infrastructure platform.

7. The one or more media of claim 1, wherein the transitioning operation comprises switching at least one message publisher and at least one message consumer from using the first message infrastructure platform to using the second message infrastructure platform.

8. The one or more media of claim 1, wherein the transitioning operation comprises:
    determining that transmission of a particular packet using the first message infrastructure platform has failed; and
    responsive at least to determining that transmission of the particular packet has failed, transmitting the particular packet using the second message infrastructure platform.

9. The one or more media of claim 1, further comprising instructions which, when executed by one or more hardware processors, causes performance of operations comprising:
    prior to transmitting the data stream with the first message infrastructure platform:
    receive a selection of at least one data stream characteristic;
    select a first message infrastructure platform based on the received at least one data stream characteristic; and
    receive the data stream from a publisher.

10. The one or more media of claim 1, further comprising:
    monitoring the first message infrastructure platform for an error condition; and
    selecting the second message infrastructure platform based on the error condition.

11. The one or more media of claim 1, wherein the transition from transmitting the data stream using the first message infrastructure platform to transmitting the data stream using the second message infrastructure platform occurs without a noticeable interruption in receipt of the data stream.

12. The one or more media of claim 1, wherein the data stream is a subscription stream, and wherein transitioning from transmitting the data stream using the first message infrastructure platform to transmitting the data stream using the second message infrastructure platform comprises:
using offset tracker information to identify a first set of messages that have been consumed and a second set of messages that have not been consumed; and
transmitting the messages in the second set of messages using the second message infrastructure platform.

13. The one or more media of claim 1, the operations further comprising dismantling the first message infrastructure platform after transitioning from transmitting the data stream using the first message infrastructure platform to the second message infrastructure platform.

14. The one or more media of claim 1, the operations further comprising:
dynamically monitoring transmission characteristics associated with the transmission of the data stream using the second message infrastructure platform;
selecting a third message infrastructure platform based on the transmission characteristics;
configuring the third message infrastructure platform with a second third set of compute resources and network resources;
transitioning from transmitting the data stream using the second message infrastructure platform to transmitting the data stream using the third message infrastructure platform; and
transmitting the data stream using the third message infrastructure platform.

15. A method comprising:
transmitting the data stream using the first message infrastructure platform comprising a first set of compute resources and network resources;
monitoring transmission characteristics associated with the transmission of the data stream using the first message infrastructure platform;
determining that the transmission characteristics do not correspond to parameters of the first message infrastructure platform;
selecting a second message infrastructure platform having parameters that correspond to the transmission characteristics;
configuring the second message infrastructure platform with a second set of compute resources and network resources;
transitioning from transmitting the data stream using the first message infrastructure platform to transmitting the data stream using the second message infrastructure platform; and
transmitting the data stream using the second message infrastructure platform.

16. The method of claim 15, further comprising:
receiving a selection of at least one data stream characteristic;
selecting a first message infrastructure platform based on the received at least one data stream characteristic; and
receiving a data stream from a publisher.

17. The method of claim 16, wherein selecting a first message infrastructure platform based on the received at least one data stream characteristic comprises applying platform selection logic to the at least one data stream characteristic to select the first message infrastructure platform.

18. The method of claim 17, further comprising:
updating the platform selection logic, when the transmission characteristics do not correspond to parameters of the first message infrastructure platform, based on the selected second message infrastructure platform.

19. The method of claim 15, wherein transitioning comprises:
identifying a transition point in a sequence of messages in the data stream;
transmitting messages prior to transition point, in the sequence of messages, using the first message infrastructure platform; and
transmitting messages subsequent to the transition point, in the sequence of messages, using the second message infrastructure platform.

20. The method of claim 19, further comprising:
configuring the second message infrastructure platform while the data stream is transmitted using the first message infrastructure platform.

21. The method of claim 20, comprising:
configuring the second message infrastructure platform prior to identifying the transition point in the sequence of messages.

22. The method of claim 15, wherein transitioning comprises:
initiating the transmitting of messages subsequent to the transition point using the second message infrastructure platform while at least one message in the sequence of messages is currently being transmitted using the first message infrastructure platform.

23. The method of claim 15, wherein transitioning further comprises:
initiating the transmitting of messages subsequent to the transition point using the second message infrastructure platform while at least one message in the sequence of messages is still stored in a buffer used for transmitting messages using the first message infrastructure platform.

24. A system comprising:
one or more processors; and
memory storing instructions that, when executed by the one or more processors, cause the system to perform:
transmitting a data stream using a first message infrastructure platform comprising a first set of compute resources and network resources;
monitoring transmission characteristics associated with the transmission of the data stream using the first message infrastructure platform;
determining that the transmission characteristics do not correspond to parameters of the first message infrastructure platform;
selecting a second message infrastructure platform having parameters that correspond to the transmission characteristics;
configuring the second message infrastructure platform with a second set of compute resources and network resources;
transitioning from transmitting the data stream using the first message infrastructure platform to transmitting the data stream using the second message infrastructure platform; and
transmitting the data stream using the second message infrastructure platform.

25. One or more non-transitory computer readable media comprising instructions which, when executed by one or more hardware processors, causes performance of operations comprising:

transmitting a data stream using a first message infrastructure platform comprising a first set of compute resources and network resources;

monitoring transmission characteristics associated with the transmission of the data stream using the first message infrastructure platform;

selecting a second message infrastructure platform based on the transmission characteristics;

configuring the second message infrastructure platform with a second set of compute resources and network resources;

transitioning from transmitting the data stream using the first message infrastructure platform to transmitting the data stream using the second message infrastructure platform;

transmitting the data stream using the second message infrastructure platform; and     dismantling the first message infrastructure platform after transitioning from transmitting the data stream using the first message infrastructure platform to the second message infrastructure platform.

26. One or more non-transitory computer readable media comprising instructions which, when executed by one or more hardware processors, causes performance of operations comprising:

transmitting a data stream using a first message infrastructure platform comprising a first set of compute resources and network resources;

monitoring transmission characteristics associated with the transmission of the data stream using the first message infrastructure platform;

selecting a second message infrastructure platform based on the transmission characteristics;

configuring the second message infrastructure platform with a second set of compute resources and network resources;

transitioning from transmitting the data stream using the first message infrastructure platform to transmitting the data stream using the second message infrastructure platform;

transmitting the data stream using the second message infrastructure platform;

dynamically monitoring transmission characteristics associated with the transmission of the data stream using the second message infrastructure platform;

selecting a third message infrastructure platform based on the transmission characteristics;

configuring the third message infrastructure platform with a third set of compute resources and network resources;

transitioning from transmitting the data stream using the second message infrastructure platform to transmitting the data stream using the third message infrastructure platform; and     transmitting the data stream using the third message infrastructure platform.

\* \* \* \* \*

UNITED STATES PATENT AND TRADEMARK OFFICE
CERTIFICATE OF CORRECTION

PATENT NO. : 12,244,657 B2
APPLICATION NO. : 18/184557
DATED : March 4, 2025
INVENTOR(S) : Joy et al.

Page 1 of 1

It is certified that error appears in the above-identified patent and that said Letters Patent is hereby corrected as shown below:

In the Specification

In Column 1, Line 57, delete "and" and insert the same on Column 1, Line 56, as a continuation of the same paragraph, therefor.

In Column 6, Line 53, delete "(QOS)" and insert -- (QoS) --, therefor.

In Column 11, Line 53, delete "(QOS)" and insert -- (QoS) --, therefor.

In the Claims

In Column 17, Line 29, in Claim 14, after "a" delete "second".

Signed and Sealed this
Third Day of June, 2025

Coke Morgan Stewart
*Acting Director of the United States Patent and Trademark Office*